(12) United States Patent
Yasuzaki

(10) Patent No.: US 10,440,220 B2
(45) Date of Patent: Oct. 8, 2019

(54) COMMUNICATION APPARATUS PERFORMING CONTROL OF OPERATION FOR COMMUNICATION USING FIRST COMMUNICATION METHOD BASED ON CONNECTION USING SECOND COMMUNICATION METHOD, AND CONTROL METHOD OF THE COMMUNICATION APPARATUS

(71) Applicant: CANON KABUSHIKI KAISHA, Tokyo (JP)

(72) Inventor: Koji Yasuzaki, Tokorozawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/137,301

(22) Filed: Sep. 20, 2018

(65) Prior Publication Data

US 2019/0028604 A1    Jan. 24, 2019

Related U.S. Application Data

(63) Continuation of application No. 15/425,293, filed on Feb. 6, 2017, now Pat. No. 10,129,431.

(30) Foreign Application Priority Data

Feb. 9, 2016    (JP) .................. 2016-023072

(51) Int. Cl.
*G06F 15/00*    (2006.01)
*G06F 3/12*    (2006.01)
(Continued)

(52) U.S. Cl.
CPC ..... *H04N 1/32534* (2013.01); *H04N 1/32069* (2013.01); *H04N 1/32593* (2013.01);
(Continued)

(58) Field of Classification Search
CPC .......... H04N 1/32534; H04N 1/32069; H04N 1/32593; H04N 1/32793; H04N 1/32797;
(Continued)

(56) References Cited

U.S. PATENT DOCUMENTS

| 2016/0198498 A1* | 7/2016 | Wada | H04W 4/80 |
| | | | 370/338 |
| 2016/0227596 A1* | 8/2016 | Otani | H04N 5/23206 |
| 2016/0241726 A1* | 8/2016 | Okamura | H04N 1/00307 |

FOREIGN PATENT DOCUMENTS

| JP | 2015073231 A | 4/2015 |
| JP | 2015179924 A | 10/2015 |

* cited by examiner

*Primary Examiner* — Douglas Q Tran
(74) *Attorney, Agent, or Firm* — Canon U.S.A., Inc. IP Division

(57) ABSTRACT

Various embodiments of the present disclosure are directed to a communication apparatus capable of preventing a decrease in the speed of communication with an external device due to execution of a handover when the communication apparatus is connected to the external device, and also directed to a control method and a recording medium. A communication apparatus provides, by using a first communication portion that uses a first communication method, communication information for performing communication based on a second communication method to an external device, and causes a second communication portion that uses the second communication method to connect with the external device using the second communication method, and performs control in such a manner that, in a case where the second communication portion connects with the external device, the first communication portion is used to provide communication information to no other external devices.

24 Claims, 13 Drawing Sheets

(51) Int. Cl.
*G06K 1/00* (2006.01)
*H04N 1/32* (2006.01)
*H04N 1/327* (2006.01)
*H04N 1/333* (2006.01)
*H04W 4/80* (2018.01)
*H04W 84/12* (2009.01)
*H04W 8/00* (2009.01)
*H04W 36/14* (2009.01)
*H04W 88/06* (2009.01)

(52) U.S. Cl.
CPC ..... *H04N 1/32793* (2013.01); *H04N 1/32797* (2013.01); *H04N 1/33323* (2013.01); *H04N 1/33384* (2013.01); *H04W 4/80* (2018.02); *H04N 2201/0094* (2013.01); *H04N 2201/3335* (2013.01); *H04W 8/005* (2013.01); *H04W 36/14* (2013.01); *H04W 84/12* (2013.01); *H04W 88/06* (2013.01)

(58) Field of Classification Search
CPC ........... H04N 1/33323; H04N 1/33384; H04N 2201/0094; H04N 2201/3335; H04W 84/12; H04W 4/80
USPC ................................ 358/1.1, 1.15, 1.13, 1.14
See application file for complete search history.

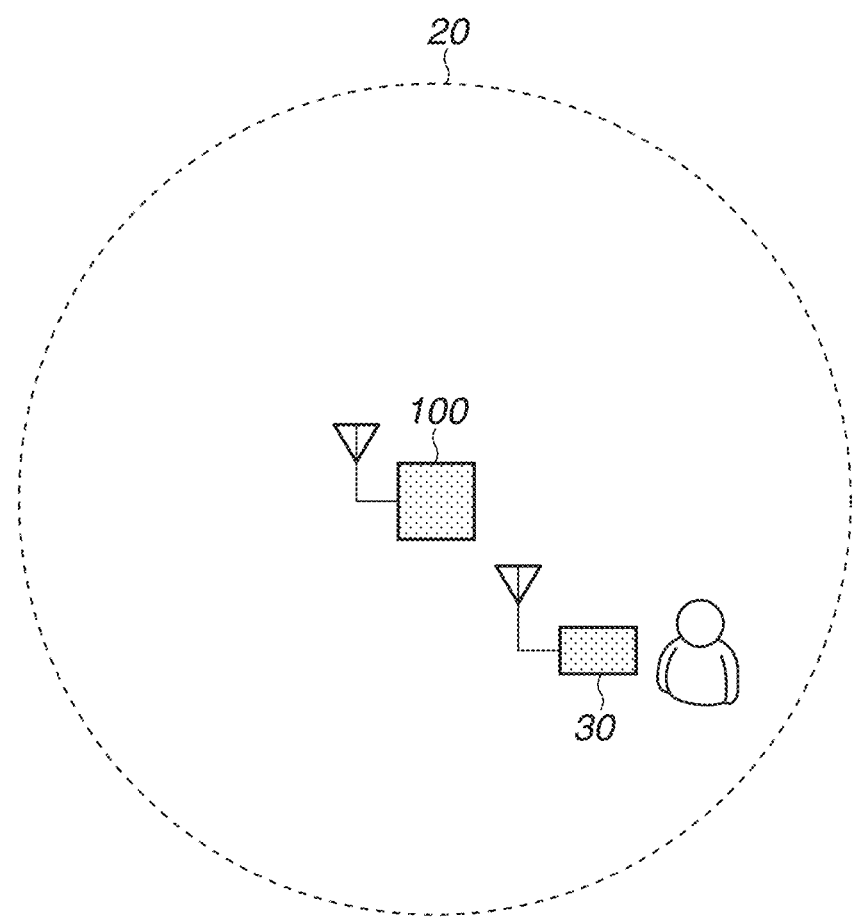

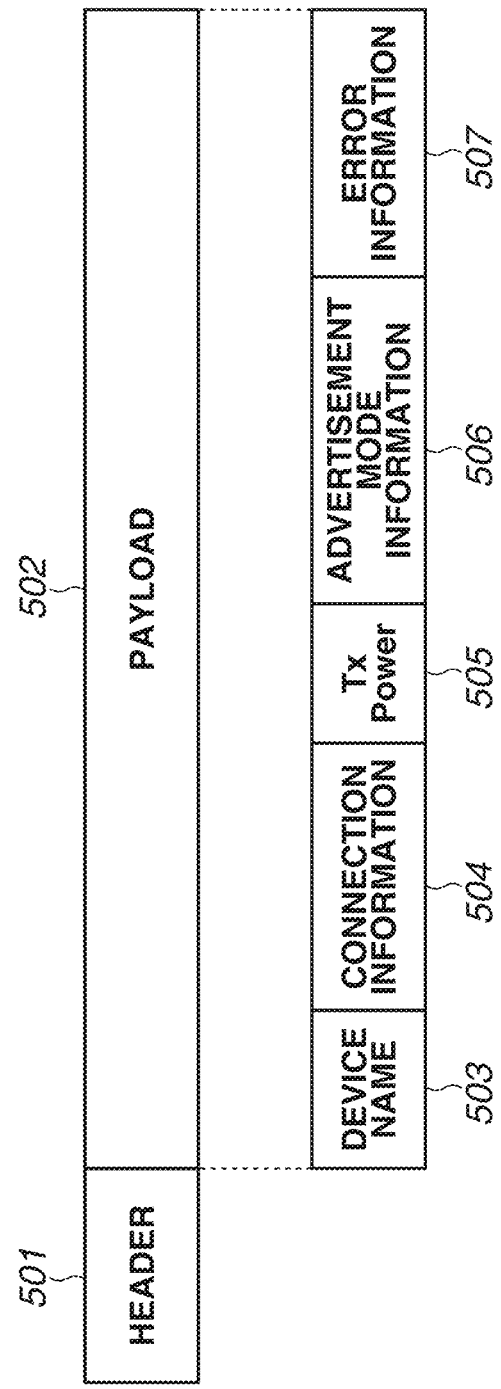

FIG.6

| JOB STATUS | JOB ERROR | RECOVERABLE ERROR | FATAL ERROR |
|---|---|---|---|
| *601* | *602* | *603* | *604* |
| 000100111110011 | 00000000 | 01000000 | 00000 |

- 0: NUMBER OF RECEIVED JOBS
- 1: NUMBER OF RECEIVED PAGES
- 2: NUMBER OF NEARBY USERS

JOB ERROR:
- 0: SHEET SIZE MISMATCH
- 1: SHEET TYPE MISMATCH
- 2: IMAGE DECODE ERROR
- 3: PACKET ERROR
- 4: COLOR MISMATCH
- 5: IMPOSITION ERROR
- 6: UNSUPPORTED PROCESSING
- 7: OTHER

RECOVERABLE ERROR:
- 0: SHEET JAM IN SHEET CONVEYANCE UNIT
- 1: SHEET JAM IN SHEET FEEDING UNIT
- 2: SHEET TRAY FULL
- 3: DISCHARGE PORT CLOSED
- 4: COVER OPENED
- 5: NO INK
- 6: LOW REMAINING INK LEVEL
- 7: OTHER

FATAL ERROR:
- 0: WASTE INK TANK FULL
- 1: PRINTING UNIT TEMPERATURE ERROR
- 2: INK CIRCULATION ERROR
- 3: POWER SUPPLY ERROR
- 4: OTHER

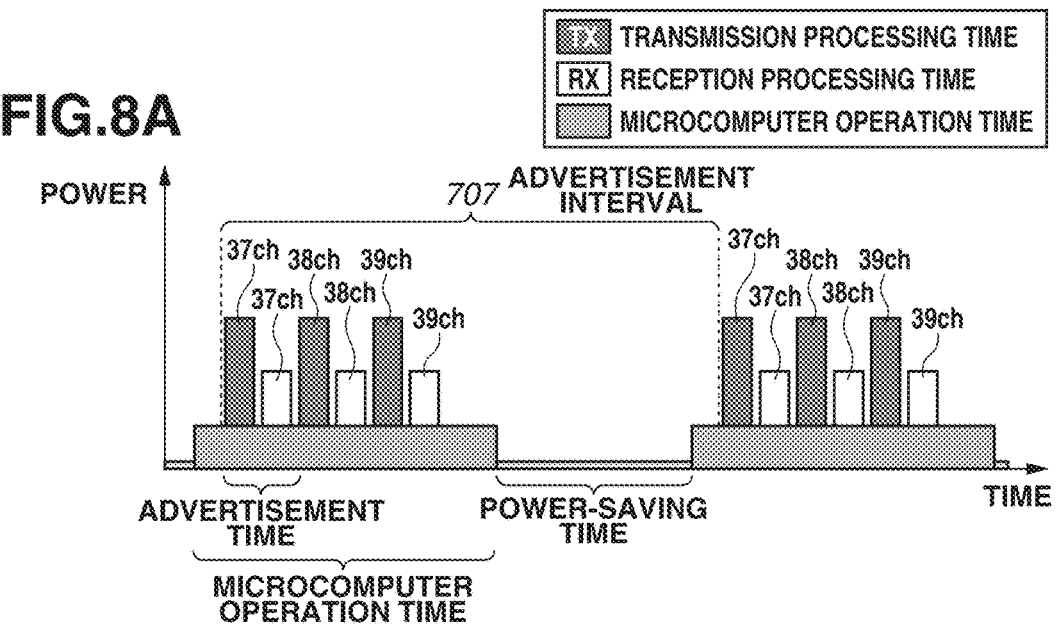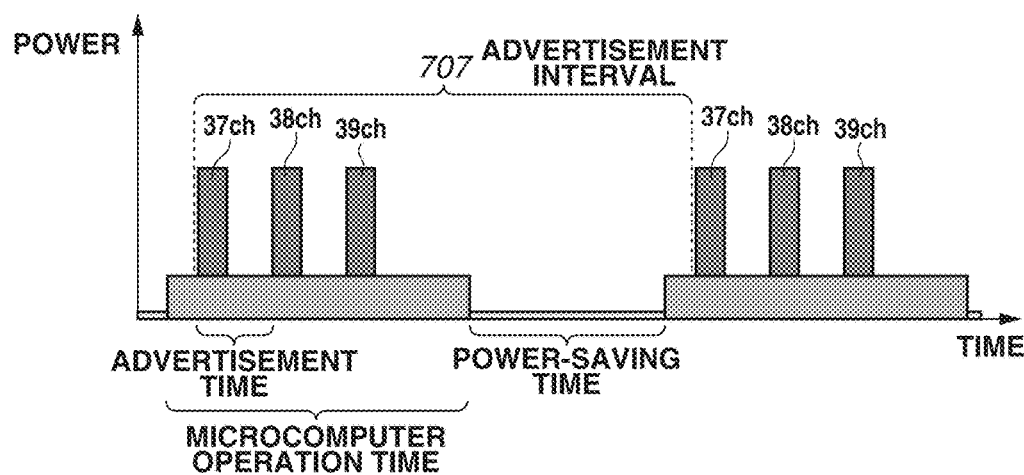

COMMUNICATION APPARATUS PERFORMING CONTROL OF OPERATION FOR COMMUNICATION USING FIRST COMMUNICATION METHOD BASED ON CONNECTION USING SECOND COMMUNICATION METHOD, AND CONTROL METHOD OF THE COMMUNICATION APPARATUS

CROSS-REFERENCE TO RELATED APPLICATION

This application is a Continuation of U.S. application Ser. No. 15/425,293, filed Feb. 6, 2017, which claims the benefit of Japanese Patent Application No. 2016-023072, filed Feb. 9, 2016. These documents are hereby incorporated by reference herein in their entirety.

BACKGROUND OF THE INVENTION

Field of the Invention

The present invention relates to a communication apparatus, a control method, and a recording medium.

Description of the Related Art

A technique called "handover" has been used. In some cases, a handover is a process of transmitting and receiving, using a near-field communication method, communication information for performing communication using a high-speed communication method, between a communication apparatus and an external device, and thereafter switching the communication to the communication using the high-speed communication method.

Japanese Patent Application Laid-Open No. 2015-11590 discusses an image processing apparatus which uses a handover to execute communication with an external device using a high-speed communication method. Further, the image processing apparatus discussed in Japanese Patent Application Laid-Open No. 2015-11590 allows connections with a plurality of external devices in parallel using a high-speed communication method.

However, since the apparatus discussed in Japanese Patent Application Laid-Open No. 2015-11590 allows connections with a plurality of external devices in parallel using the high-speed communication method, there is a possibility of a decrease in the speed of communication with each of the external devices connected in parallel.

SUMMARY OF THE INVENTION

Various embodiments of the present disclosure are directed to a communication apparatus, a control method, and a recording medium that seek to prevent a decrease in the speed of communication with an external device due to execution of a handover when the communication apparatus is connected to the external device.

According to various embodiments, a communication apparatus including a first communication portion capable of communicating with an external device by using a first communication method and a second communication portion capable of communicating with the external device by using a second communication method that is different from the first communication method, includes a first communication unit configured to provide communication information for performing communication based on the second communication method to the external device by using the first communication portion, a second communication unit configured to cause the second communication portion to connect with the external device using the second communication method after the communication information is provided to the external device by the first communication portion, and a control unit configured to perform control in such a manner that, in a case where the second communication portion connects with the external device, the first communication portion is used to provide the communication information for performing communication to no other external devices.

Further features will become apparent from the following description of exemplary embodiments with reference to the attached drawings.

BRIEF DESCRIPTION OF THE DRAWINGS

FIG. 1 illustrates the configuration of a communication system according to an exemplary embodiment.

FIG. 5 illustrates the configuration of an advertisement packet according to one exemplary embodiment.

FIG. 6 illustrates details of error information stored in an advertisement packet according to one exemplary embodiment.

FIGS. 8A, 8B, and 8C each illustrate advertisement in respective advertisement modes according to one exemplary embodiment.

DESCRIPTION OF THE EMBODIMENTS

Figure 2A:
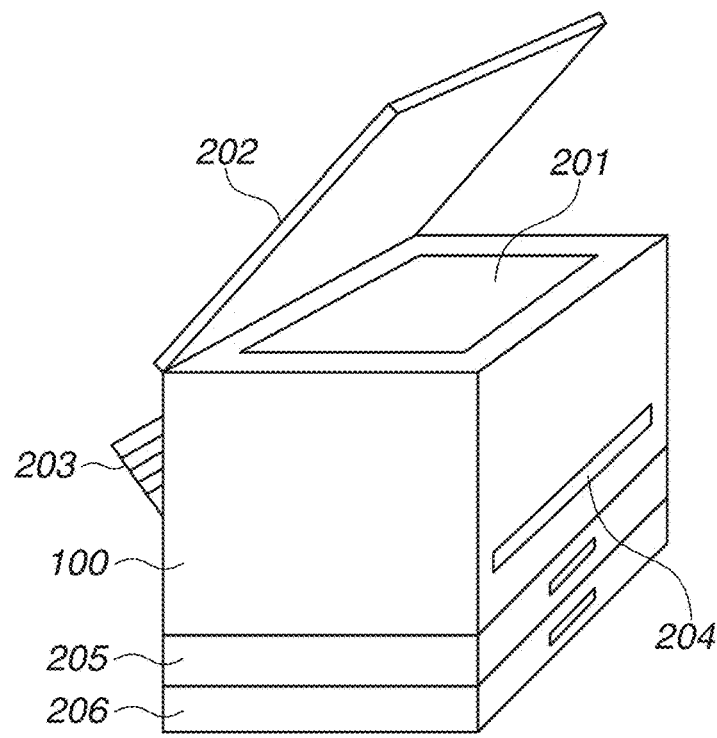
FIGS. 2A and 2B are external views each illustrating a communication apparatus to which an exemplary embodiment is applied.

Various exemplary embodiments will be described below with reference to the accompanying drawings. It should be understood that changes and modifications made as appropriate to the following exemplary embodiments based on general knowledge of those skilled in the art without departing from the spirit or essential features thereof are also encompassed within the scope of the disclosure.

The following describes a communication apparatus to which an exemplary embodiment is applied. The communication apparatus is an apparatus capable of receiving a job from an external device. In the present exemplary embodiment, an inkjet multi-function peripheral (MFP) is described as an example of the communication apparatus. MFP refers to an apparatus having a plurality of functions such as a print function, scanner function, copy function, and fax function. The communication apparatus may be, for example, a copy machine, fax machine, scanner, personal computer (PC), smartphone, tablet terminal, personal digital assistant (PDA), digital camera, or music reproduction device. Further, in a case where the communication apparatus is a printer, a printing method to be used is not limited to an inkjet method and may be, for example, an electrophotographic method. Further, the communication apparatus may be a single-function peripheral (SFP) instead of MFP. The external device is an apparatus capable of connecting to the communication apparatus by a handover described below. In the present exemplary embodiment, a mobile terminal capable of performing Bluetooth® low energy (hereinafter, referred to as "BLE") communication is described as an example of the external device. BLE is one of the near-field wireless communication standards. The external device may be, for example, a PC, a smartphone, a tablet terminal, a PDA, or a camera.

The following describes a communication system according to the present exemplary embodiment with reference to FIG. 1.

An MFP 100 is a communication apparatus to which the present exemplary embodiment is applied. The MFP 100 operates as a slave apparatus in BLE communication. Further, the MFP 100 is capable of transmitting (broadcasting) an advertisement packet to an unspecified external device located near the MFP 100 without connecting to a specific terminal via a network.

A mobile terminal 30 is an external device in the present exemplary embodiment. The mobile terminal 30 operates as a master apparatus in BLE communication. When the mobile terminal 30 is within a packet coverage area 20, which is the coverage of an advertisement packet transmitted by the MFP 100, the mobile terminal 30 can receive an advertisement packet transmitted from the MFP 100. When the mobile terminal 30 is located within a packet coverage area of a plurality of communication apparatuses, the mobile terminal 30 can receive an advertisement packet from each of the plurality of communication apparatuses. Further, the mobile terminal 30 can estimate an approximate distance to the MFP 100 based on the signal intensity of the advertisement packet received from the MFP 100.

Figure 2B:
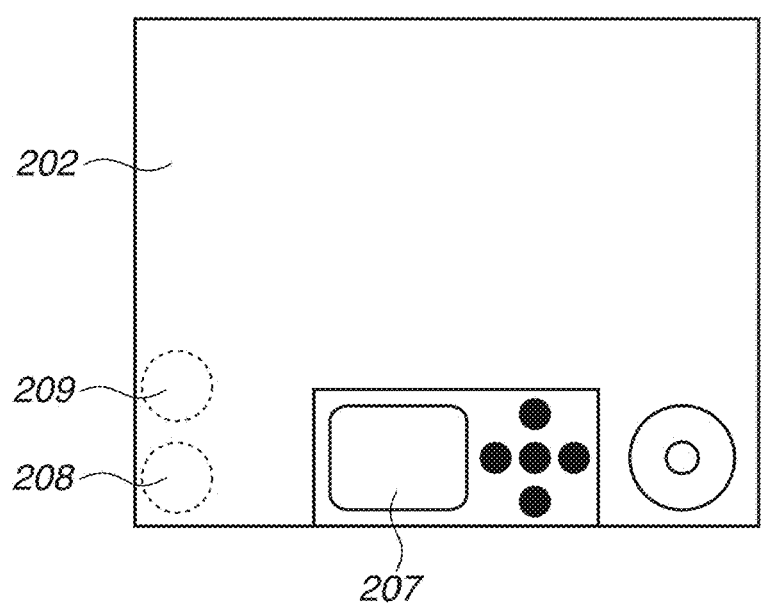

FIGS. 2A and 2B are external views each illustrating the MFP 100. FIG. 2A is a perspective view of the MFP 100, and FIG. 2B is a top view of the MFP 100.

A platen 201 is a transparent glass platen and used as a platen on which an original document is placed to be read by a scanner. An original document cover 202 is used to prevent leakage of reading light to the outside while the scanner reads an original document. The original document cover 202 is rotatably moved about a supporting point where the original document cover 202 is connected to the platen 201.

A printing medium insertion port 203 is used to hold printing mediums of various sizes. Printing mediums set in the printing medium insertion port 203 is conveyed one by one to a recording unit 314, which will be described below, undergoes printing according to a print job transmitted from the mobile terminal 30, and is discharged from a printing medium discharge port 204. Further, the MFP 100 includes cassettes 205 and 206 as other printing medium feeding units. A printing medium corresponding to a print job is set in advance in the cassette 205 or 206 so that the MFP 100 can start printing without receiving the feed of a printing medium for each printing. Examples of a printing medium that can be used in the MFP 100 include paper, overhead projector (OHP) sheets, labels, and films.

An upper portion of the original document cover 202 includes an operation display unit 207, a Bluetooth (BT)® communication unit 208, and a Wi-Fi® communication unit 209. The operation display unit 207 includes a display screen for displaying an image, an operation menu, and the like, arrow keys for moving a cursor and the like on the display unit, and keys for executing various other functions. The BT communication unit 208 is used to perform BT communication and BLE communication. Details of the BT communication unit 208 will be described below with reference to FIG. 4. The Wi-Fi communication unit 209 is used to perform Wi-Fi® communication.

The locations of the respective units described above are not limited to the locations specified in FIGS. 2A and 2B, and the units may be located in other positions.

Figure 3:
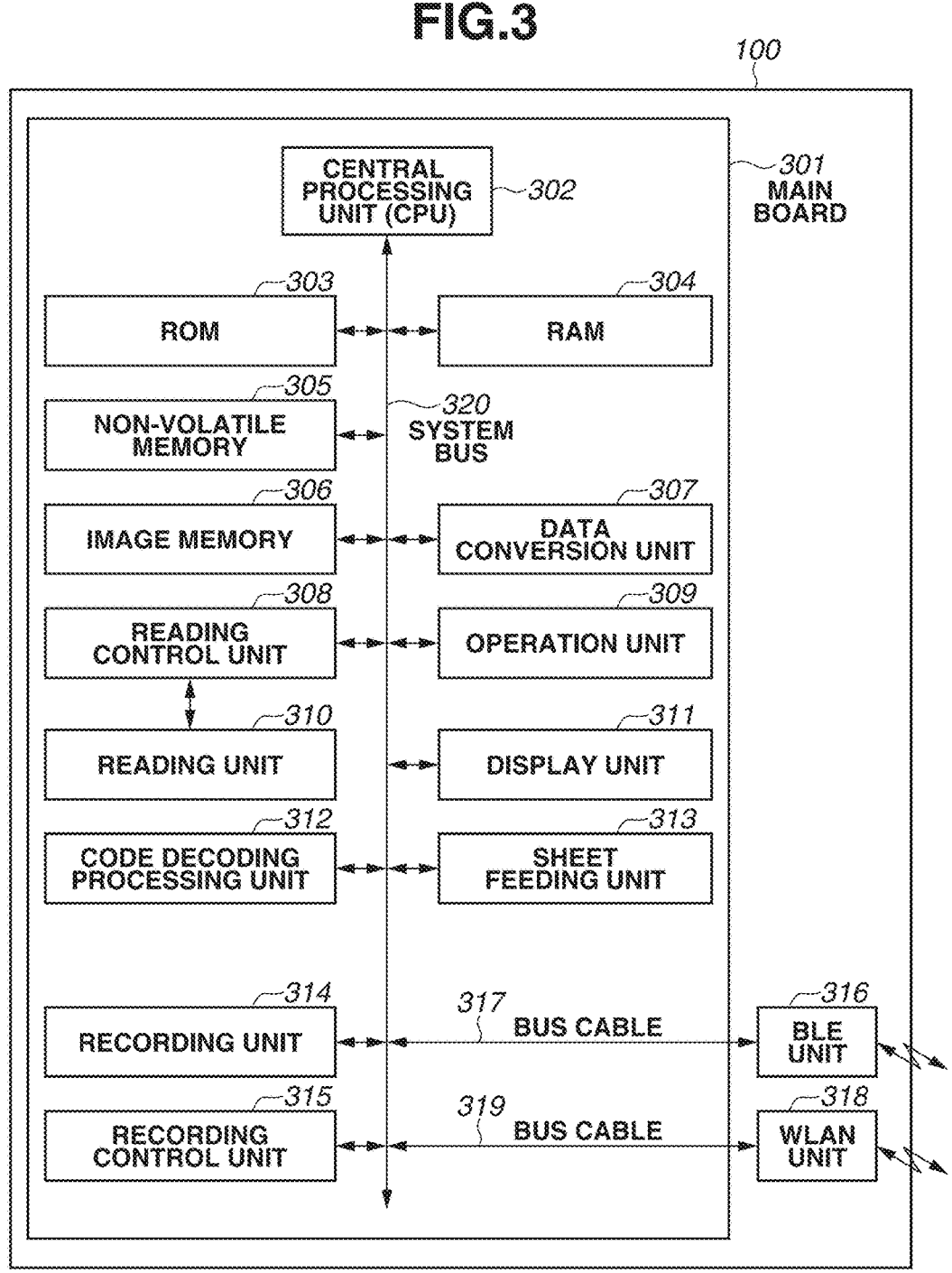
FIG. 3 is a block diagram schematically illustrating the configuration of a communication apparatus to which an exemplary embodiment is applied.

FIG. 3 is a block diagram schematically illustrating the configuration of the MFP 100.

The MFP 100 includes a main board 301, a BLE unit 316, and a wireless local area network (WLAN) unit 318. The main board 301 performs main control on the apparatus. The BLE unit 316 performs BT communication and BLE communication. The WLAN unit 318 performs Wi-Fi communication.

In the main board 301, a central processing unit (CPU) 302 is a system control unit and controls the entire MFP 100. A read-only memory (ROM) 303 stores various programs such as a control program to be executed by the CPU 302 and an embedded operating system (hereinafter, referred to as "OS") program. In the present exemplary embodiment, the control program stored in the ROM 303 is executed to perform software control such as scheduling and task switching under the control of the embedded OS stored in the ROM 303. A random access memory (RAM) 304 includes a memory such as a static RAM (SRAM). The RAM 304 stores program control variables, setting values registered by a user, management data of the MFP 100, setting information such as mode change conditions described below, and the like. The RAM 304 includes buffer areas for various types of work. The data described above may be stored not in the RAM 304 but in a different storage area such as the ROM 303 or a non-volatile memory 305.

The non-volatile memory 305 includes a memory such as a flash memory and stores data which is to be retained even if the power supply is turned off. Examples of data stored in the non-volatile memory 305 include network information such as a password and authentication information for connecting to a network, a list of previously connected external devices including media access control (MAC) addresses and service set identifiers (SSIDs), and setting information of the MFP 100 such as menu items including a printing mode and recording head correction information. The setting information data may be stored not in the non-volatile memory 305 but in a different storage area such as the ROM 303 or the RAM 304. Further, the CPU 302 may perform processing using the setting information stored in the ROM 303 or the non-volatile memory 305 by loading the setting information into the RAM 304.

An image memory 306 includes a memory such as a dynamic RAM (DRAM) and stores various types of data such as image data received via the BLE unit 316, the WLAN unit 318, and the like, and image data processed by a code decoding processing unit 312.

The memory configuration of the MFP 100 is not limited to the foregoing configuration, and the number, characteristics, storage capacity, and the like of the memories can be changed as appropriate according to a use or a purpose of use. For example, the image memory 306 and the RAM 304 may be shared. Further, while the image memory 306 includes the DRAM, the image memory 306 is not limited to the DRAM and may include a hard disk (hereinafter, referred to as "HDD") or a non-volatile memory.

A data conversion unit 307 performs various types of image processing such as smoothing processing, recording density correction processing, and color correction on image data contained in a received job via an image processing control unit (not illustrated). The data conversion unit 307 executes the foregoing processing to convert image data to be printed into high-definition print data and outputs the converted print data to the recording unit 314.

A reading unit 310 optically reads an original document with a contact image sensor (CIS) or the like. A reading control unit 308 performs various types of image processing such as binarization processing and halftone processing on image signals read by the reading unit 310 to output high-definition image data.

An operation unit 309 and a display unit 311 correspond to the operation display unit 207. The operation unit 309 and a display unit 311 receive various types of input entered to the MFP 100 and display various types of information about the MFP 100.

The code decoding processing unit 312 performs various types of processing such as code decoding processing and enlargement/reduction processing on image data.

A sheet feeding unit 313 holds printing mediums for printing and feeds the printing mediums to the recording unit 314 according to control by a recording control unit 315. The sheet feeding unit 313 corresponds to the printing medium insertion port 203 and the cassettes 205 and 206.

The recording control unit 315 controls which one of the printing medium insertion port 203 and the cassettes 205 and 206 feeds a sheet. Further, the recording control unit 315 plays a role of updating information of the RAM 304 by periodically reading various types of information such as the status of the recording unit 314. More specifically, the recording control unit 315 updates information such as the apparatus status indicating that the apparatus is in use or in a sleep state or an error occurs, and the level of remaining ink in an ink tank.

The recording unit 314 executes image formation processing (printing processing) to form an image on a printing medium with a recording agent such as ink based on print setting information contained in print data or a print job output from the data conversion unit 307.

The BLE unit 316 is a unit configured to realize communication in accordance with BLE standards and corresponds to the BT communication unit 208. The BLE unit 316 is used for both classic BT communication and BLE communication. The BLE unit 316 serves functions for the transmission of advertisement packets, reception of connection request information, and data communication (e.g., provision of a job or information for performing communication using a different communication) with an external device with which a BLE connection is established. The BLE unit 316 establishes a BLE connection with another BLE unit by transmitting and receiving an advertisement packet and connection request information described below. Further, the BLE unit 316 is connected to a system bus 320 via a bus cable 317.

The WLAN unit 318 is a unit configured to realize communication in accordance with Wi-Fi standards and corresponds to the Wi-Fi communication unit 209. The WLAN unit 318 serves the functions of performing connection information transmission processing and authentication processing for establishing a Wi-Fi connection and receiving a job from an external device with which a Wi-Fi connection is established. Further, the WLAN unit 318 is connected to the system bus 320 via a bus cable 319.

The above-described components 302 to 319 are connected to one another via the system bus 320 managed by the CPU 302.

The MFP 100 may include a communication unit other than the BLE unit 316 and the WLAN unit 318. The communication may be performed directly via wireless communication or may be performed via an access point located outside the MFP 100 on a network. Examples of the communication method include NFC (Near Field Communication; ISO/IEC IS 18092) and Wi-Fi Aware. Further, the communication is not limited to wireless communication and may be wired communication via a wired local area network (LAN) or the like. The MFP 100 receives a job from other external devices such as the mobile terminal 30 via a network using the above-described communication methods.

Further, a method by which the MFP 100 receives a job is not limited to the method of receiving a job from an external device via wireless or wired communication. For example, the MFP 100 may receive a job by receiving an instruction for printing or scanning directly from a user via the operation unit 309.

Figure 9:
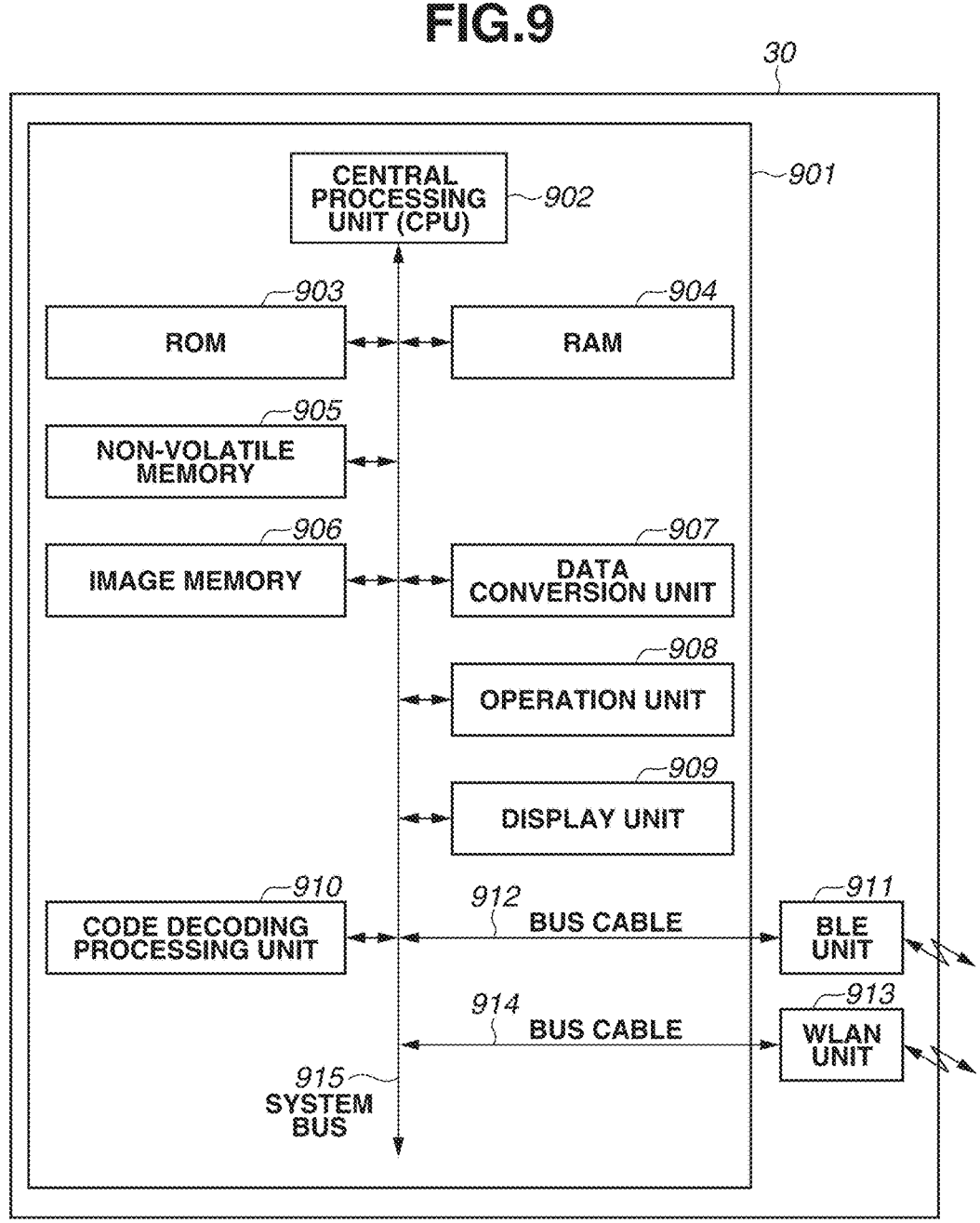
FIG. 9 is a block diagram schematically illustrating the configuration of an external device capable of communicating with a communication apparatus to which an exemplary embodiment is applied.

FIG. 9 is a block diagram schematically illustrating the configuration of the mobile terminal 30.

The mobile terminal 30 includes a main board 901, a BLE unit 911, and a WLAN unit 913. The main board 901 performs main control on the apparatus. The BLE unit 911 performs BT communication and BLE communication. The WLAN unit 913 performs Wi-Fi communication.

In the main board 901, a CPU 902 is a system control unit and controls the entire mobile terminal 30. A ROM 903 stores various programs such as a control program to be executed by the CPU 902 and an embedded OS program. In the present exemplary embodiment, the control program stored in the ROM 903 is executed to perform software control such as scheduling and task switching under the control of the embedded OS stored in the ROM 903. A RAM 904 includes a memory such as a SRAM. The RAM 904 stores program control variables, setting values registered by a user, management data of the mobile terminal 30, and the like. The RAM 904 includes buffer areas for various types of work. The setting information data described above may be stored not in the RAM 904 but in a different storage area such as the ROM 903 or a non-volatile memory 905.

The non-volatile memory 905 includes a memory such as a flash memory and stores data which is to be retained even if the power supply is turned off. Examples of data stored in the non-volatile memory 905 include network information such as a password and authentication information for connecting to a network, a list of previously connected external devices including MAC addresses and SSIDs, and setting information of the mobile terminal 30. The setting information data may be stored not in the non-volatile memory 905 but in a different storage area such as the ROM 903 or the RAM 904. Further, the CPU 902 may perform processing using the setting information stored in the ROM 903 or the non-volatile memory 905 by loading the setting information into the RAM 904.

An image memory 906 includes a memory such as a DRAM and stores various types of data such as image data received via the BLE unit 911, the WLAN unit 913, and the like, and image data processed by a code decoding processing unit 910.

The memory configuration of the mobile terminal 30 is not limited to the foregoing configuration, and the number, characteristics, storage capacity, and the like of the memories can be changed as appropriate according to a use or purposes of use. For example, the image memory 906 and the RAM 904 may be shared. Further, while the image memory 906 includes the DRAM, the image memory 906 is not limited to the DRAM and may include a HDD or non-volatile memory.

A data conversion unit 907 generates data such as page description language (PDL) data and performs data conversion such as color conversion and image conversion on image data.

An operation unit 908 and a display unit 909 receive various types of input entered to the mobile terminal 30 and display various types of information about the mobile terminal 30.

The code decoding processing unit 910 performs various types of processing such as code decoding processing and enlargement/reduction processing on image data.

The BLE unit 911 is a unit configured to realize communication in accordance with BLE standards. The BLE unit 911 is a unit for both classic BT communication and BLE communication. The BLE unit 911 serves the functions of receiving an advertisement packet, transmitting connection request information, performing data communication with an apparatus with which a BLE connection is established, and the like. Further, the BLE unit 911 is connected to a system bus 915 via a bus cable 912.

The WLAN unit 913 is a unit configured to realize communication in accordance with Wi-Fi standards. The WLAN unit 913 serves the functions of performing scanning processing and authentication processing for establishing a Wi-Fi connection, receiving a job from an external device with which a Wi-Fi connection is established, and the like. Further, the WLAN unit 913 is connected to the system bus 915 via a bus cable 914.

The above-described components 902 to 914 are connected to one another via the system bus 915 managed by the CPU 902.

The mobile terminal 30 may include a communication unit other than the BLE unit 911 and the WLAN unit 913. Further, the mobile terminal 30 may include a plurality of communication units to be capable of performing communication using a plurality of types of communication methods. The communication may be performed directly via wireless communication or may be performed via an access point located outside the mobile terminal 30 on a network. Examples of the communication methods include NFC and Wi-Fi Aware. Further, the communication may be not wireless communication but wired communication.

Figure 4:
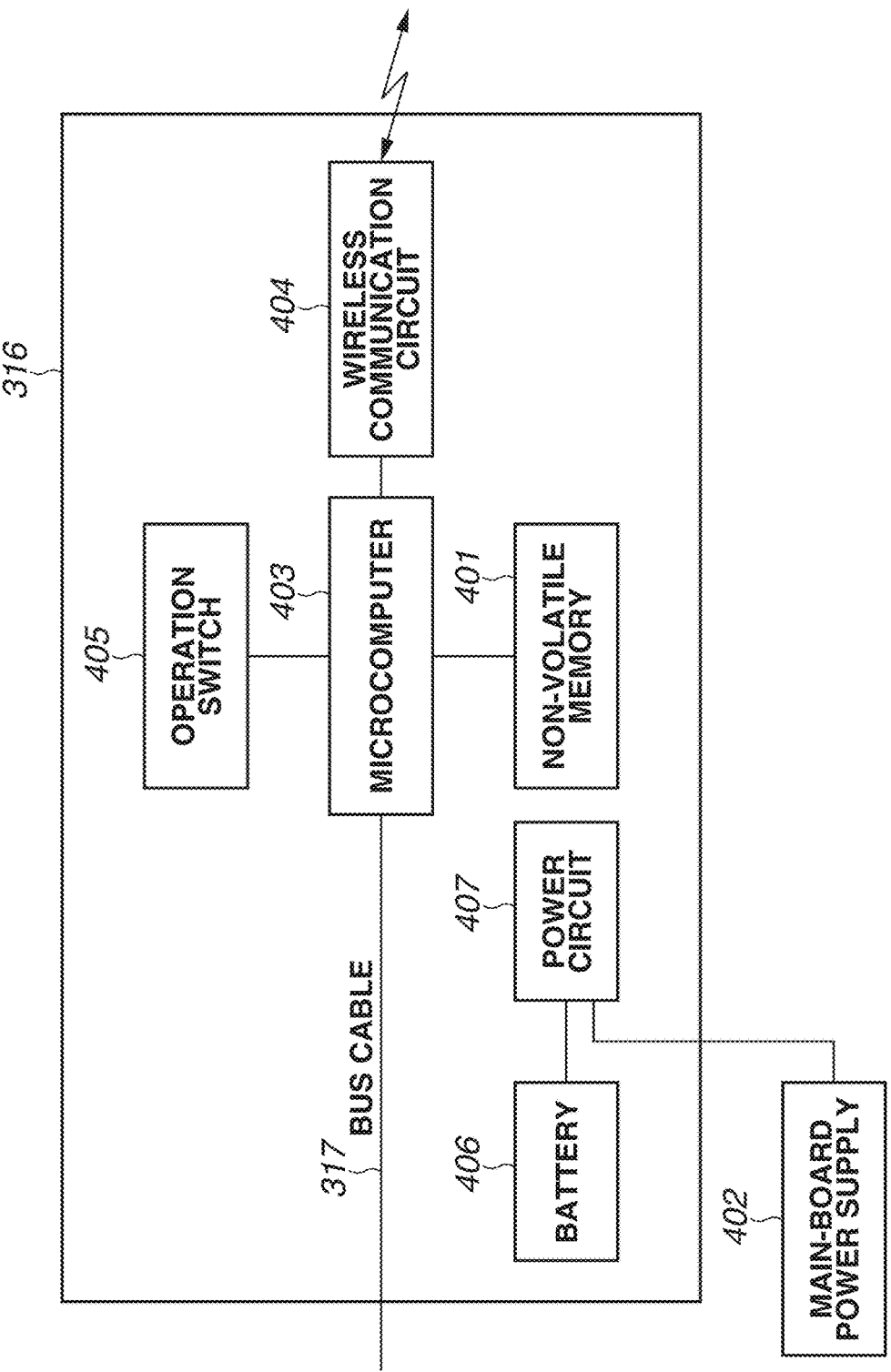
FIG. 4 is a block diagram schematically illustrating the configuration of a Bluetooth low energy (BLE) unit included in a communication apparatus to which an exemplary embodiment is applied.

FIG. 4 is a block diagram schematically illustrating the configuration of the BLE unit 316. The bus cable 317 is a cable for transmitting and receiving data to be transmitted and received in BLE communication between the main board 301 and a microcomputer 403. The microcomputer 403 is a microprocessor configured to perform processing to realize BLE communication. The microcomputer 403 includes a RAM and a flash memory. A wireless communication circuit 404 includes a wireless communication chip, a crystal oscillator, an inductor, and a capacitor. The wireless communication circuit 404 is a component of the physical layer (PHY) in BLE and performs advertisement described below and data communication after the establishment of BLE connection by modulating/demodulating analog signals, changing to digital symbols, and the like. An operation switch 405 is a switch for turning on or off the supply of power to the BLE unit 316. A battery 406 is a button battery or the lie. A main-board power supply 402 is a power supply operated by power supplied from the main board 301. A power circuit 407 is a circuit configured to perform processing such as voltage adjustment to supply power from the battery 406 more efficiently. The BLE unit 316 includes the two power supply systems, the battery 406 and the main-board power supply 402, so that even if the supply of power from the main board 301 is stopped because, for example, the power supply of the MFP 100 is turned off or the MFP 100 is switched to a power-saving mode, the BLE unit 316 can perform BLE communication. Further, the BLE unit 316 includes a non-volatile memory 401 and transfers information transmitted from the main board 301 to the non-volatile memory 401. In this way, even when the BLE unit 316 is unable to communicate with the main board 301, the BLE unit 316 can perform BLE communication with other apparatuses. Further, the BLE unit 911 has a similar configuration to the configuration of the BLE unit 316.

Figure 7:
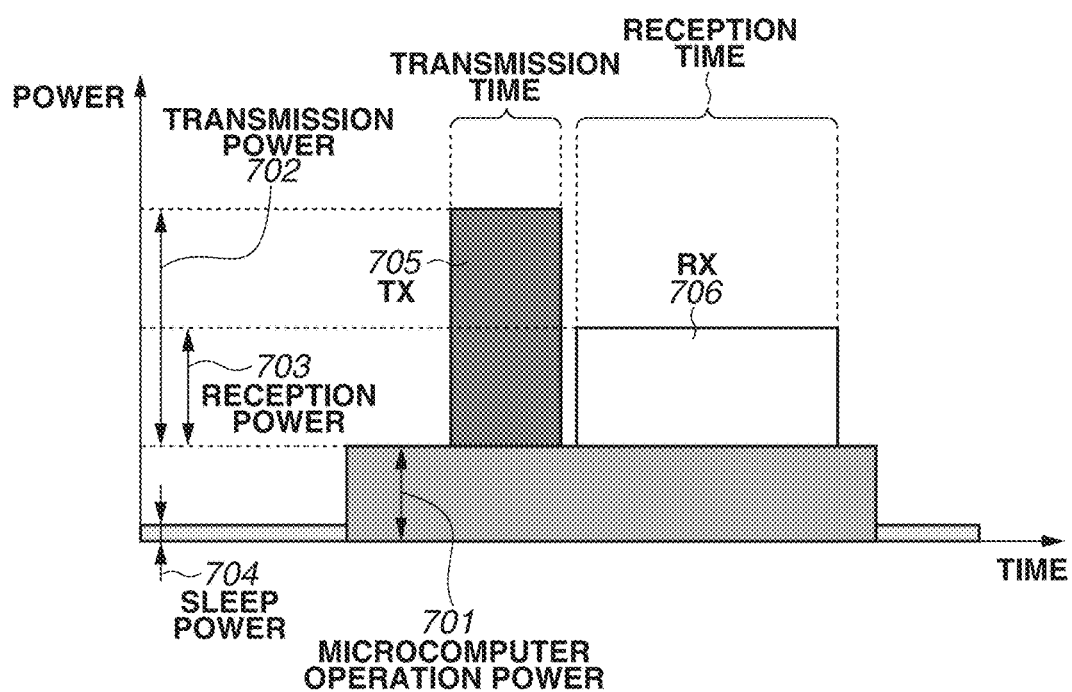
FIG. 7 illustrates a process of broadcasting an advertisement packet and receiving connection request information which is performed by a communication apparatus to which an exemplary embodiment is applied.

The following describes a process of transmitting an advertisement packet and receiving connection request information in BLE, with reference to FIG. 7. In the present exemplary embodiment, the MFP 100 operates as a slave device, so the BLE unit 316 performs the processing described above.

The BLE unit 316 divides a frequency band of 2.4 GHz into 40 channels (0 to 39ch) and performs communication. The BLE unit 316 uses the 37th to 39th channels for the transmission of an advertisement packet and the reception of connection request information, and uses the 0th to 36th channels for the data communication after the establishment of BLE connection. In FIG. 7, the vertical axis shows the power consumption of the BLE unit 316, and the horizontal axis shows the time. FIG. 7 illustrates for each processing the power consumption at the time of transmitting an advertisement packet using one channel. Tx 705 indicates the total power consumption in the transmission processing that is advertisement packet broadcasting processing. Rx 706 indicates the total power consumption in the reception processing which is the processing to enable a receiver for receiving connection request information. Transmission power 702 indicates the instantaneous power consumption of the transmission processing. Further, reception power 703 indicates the instantaneous power consumption of the reception processing. Further, microcomputer operation power 701 indicates the instantaneous power consumption during the operation of the microcomputer 403. The microcomputer 403 also operates before, after, and between Tx 705 and Rx 706 because the microcomputer 403 needs to be activated in advance in order to execute or stop transmission/reception processing. Further, in a case where the advertisement packet transmission is performed using a plurality of channels, the power consumption increases by the number of channels used in the advertisement packet transmission. Further, when the microcomputer 403 is not operating and the BLE unit 316 is in a power-saving state, the instantaneous power consumption of the BLE unit 316 is sleep power 704. As described above, the BLE unit 316 performs transmission processing using a predetermined channel and then performs reception processing using the same channel for a predefined time period, thereby waiting for connection request information to be transmitted from an external device.

Further, as illustrated in FIG. 8A, the BLE unit 316 repeats the advertisement packet transmission processing and reception processing three times for each channel and then stops the operation of the microcomputer 403 to change to the power-saving state for a predefined time period. Hereinafter, a combination of the advertisement packet transmission processing and reception processing using a predetermined channel will be referred to as advertisement. Further, a time interval between the advertisement packet transmission using a predetermined channel will be referred to as an advertisement interval. The number of times the advertisement is repeated between the time point at which the advertisement is performed for the first time and the time point at which the state is changed to the power-saving state may be changed to any number no more than three.

FIG. 5 illustrates an example of the configuration of an advertisement packet that the BLE unit 316 broadcasts in the vicinity of the MFP 100.

When the supply of power is started, the BLE unit 316 performs initialization processing to change to an advertising state. When the BLE unit 316 is in the advertising state, the BLE unit 316 periodically broadcasts an advertisement packet to the surrounding area based on the advertisement interval. The advertisement packet is a signal containing basic header information (e.g., identification information for the identification of an apparatus transmitting the advertisement packet) and includes a header 501 and payload 502. An external device can recognize the presence of the MFP 100 by receiving the advertisement packet. Further, the external device can establish a BLE connection with the MFP 100 by transmitting connection request information to the MFP 100. The header 501 is an area where information such as the type of the advertisement packet and the size of the payload 502 is stored. The payload 502 stores information such as the device name as identification information, loaded profile information, connection information for connecting to the MFP 100, and advertisement packet transmission power (Tx Power).

The following describes details of the payload 502. A device name 503 stores identification information for the identification of the MFP 100. The identification information is information for uniquely identifying the MFP 100, and examples of the identification information include a character string defined by BLE, serial number of the MFP 100, and MAC address.

Connection information 504 stores information for establishing a BLE connection with the MFP 100. More specifically, the information for establishing a BLE connection corresponds to protocol data defined by BLE. An external device such as the mobile terminal 30 establishes a BLE connection by transmitting and receiving the protocol data.

Further, at this time, the MFP 100 and the external device can establish a connection using a technology other than BLE. For example, connection information for a connection to a WLAN unit (not illustrated) included in the MFP 100 may be set as information for a connection to the MFP 100 so that the external device having received the advertisement packet can establish a WLAN connection with the MFP 100. The connection information 504 may store search information that is information indicating whether to allow the external device to search for the MFP 100. For example, the external device having received the advertisement packet storing the search information indicating that a search is not allowed can notify a user of the state of the MFP 100 but cannot establish a connection with the MFP 100 or list the MFP 100 as a candidate apparatus to be connected. In other words, in this case, the MFP 100 can uni-directionally transmit information to the external device. The search information may use a flag to indicate whether to allow a search for the MFP 100.

Tx Power 505 stores information about the advertisement packet transmission power. The external device having received the advertisement packet can estimate the distance between the MFP 100 and the external device by calculating the transmission loss from the Tx Power 505 and the signal intensity at the time of the reception of the advertisement packet.

Advertisement mode information 506 stores information about an advertisement mode of the MFP 100 at the time of the transmission of the advertisement packet. Details of the advertisement mode will be described below.

Error information 507 stores information indicating an error state of the MFP 100 at the time of the transmission of the advertisement packet. The external device having received the advertisement packet refers to the error information 507 to identify an occurrence of an error in the MFP 100 and notify a user of the occurrence of the error without establishing a connection with the MFP 100.

The following describes details of the error information 507 with reference to FIG. 6. The error information 507 includes job status information (hereinafter, referred to as "job status 601"), job error information (hereinafter, referred to as "job error 602"), recoverable error information (hereinafter, referred to as "recoverable error 603"), and fatal error information (hereinafter, referred to as "fatal error 604"). The job error, the recoverable error, and the fatal error are classifications of errors that can occur in the MFP 100. In a case where the MFP 100 is in any of the above-described error states, information indicating the error state of the MFP 100 is stored in the error information 507.

In the present exemplary embodiment, a bit is assigned to the error information so that even when a plurality of errors occurs, each of the occurring errors is notified to the user. Further, the external device having received the advertisement packet can identify the error state occurring in the MFP 100 based on the information contained in the error information 507 and notify the identified error state to the user. Thus, the user can check the notification from the external device to determine whether to cancel the error and then use the MFP 100 or to use a different communication apparatus.

The job status 601 stores information such as the status of a job currently received by the MFP 100. Examples of the stored information include the number of received jobs and the number of received pages. The external device having received the advertisement packet identifies the number of received jobs and the number of received pages to estimate (identify) an approximate waiting time from the time point at which a job is transmitted to the time point at which the job is processed.

The job error 602 stores a value indicating details of an error that occurs when the MFP 100 receives and executes a job. Examples of the job error include a sheet size mismatch, sheet type mismatch, image decode error, packet error, color mismatch, imposition error, and lack-of-support error. The job error is likely to occur in a case where, for example, setting information of a transmitted job does not match the setting information of the MFP 100. In other words, in many cases the job error can be solved by retransmitting an appropriate job from the external device having received the advertisement packet or by changing the setting of the MFP 100. The MFP 100 may store the job error 602 in the advertisement packet to thereby notify an external device held by a user near the MFP 100 that the MFP 100 is in the job error state.

The recoverable error 603 stores a value indicating an error that requires user maintenance of the MFP 100 among the errors occurring in the MFP 100. The value indicating the error is assigned to the recoverable error 603 for each bit as in the job error 602. Examples of the recoverable error include a sheet jam in a sheet conveyance unit, a sheet jam in a sheet feeding unit, sheet tray full, discharge port closed, cover opened, no ink, low remaining ink level, and other errors that require user maintenance. The MFP 100 stores the recoverable error 603 in the advertisement packet to thereby notify an external device held by a user near the MFP 100 that the MFP 100 is in the recoverable error state.

The fatal error 604 stores a value indicating an error that is difficult to recover by user maintenance among the errors occurring in the MFP 100. The error that is difficult to recover by user maintenance refers to, for example, an error that cannot be recovered by a normal user and requires contact with a service center. More specifically, examples of the fatal error include waste ink tank full, printing unit temperature error, power supply error, and other errors that are difficult to recover by maintenance. The MFP 100 stores the fatal error 604 in the advertisement packet to thereby notify an external device held by a user near the MFP 100 that the MFP 100 is in the fatal error state.

The configurations illustrated in FIGS. 5 and 6 are mere examples, and the MFP 100 may store data other than those specified in FIGS. 5 and 6 in the advertisement packet and broadcast the advertisement packet. For example, a flag indicating that information that cannot be stored in the advertisement packet is to be broadcast in a next advertisement packet, capability information about the MFP 100, and information about the type of the advertisement packet may be stored.

Figure 10:
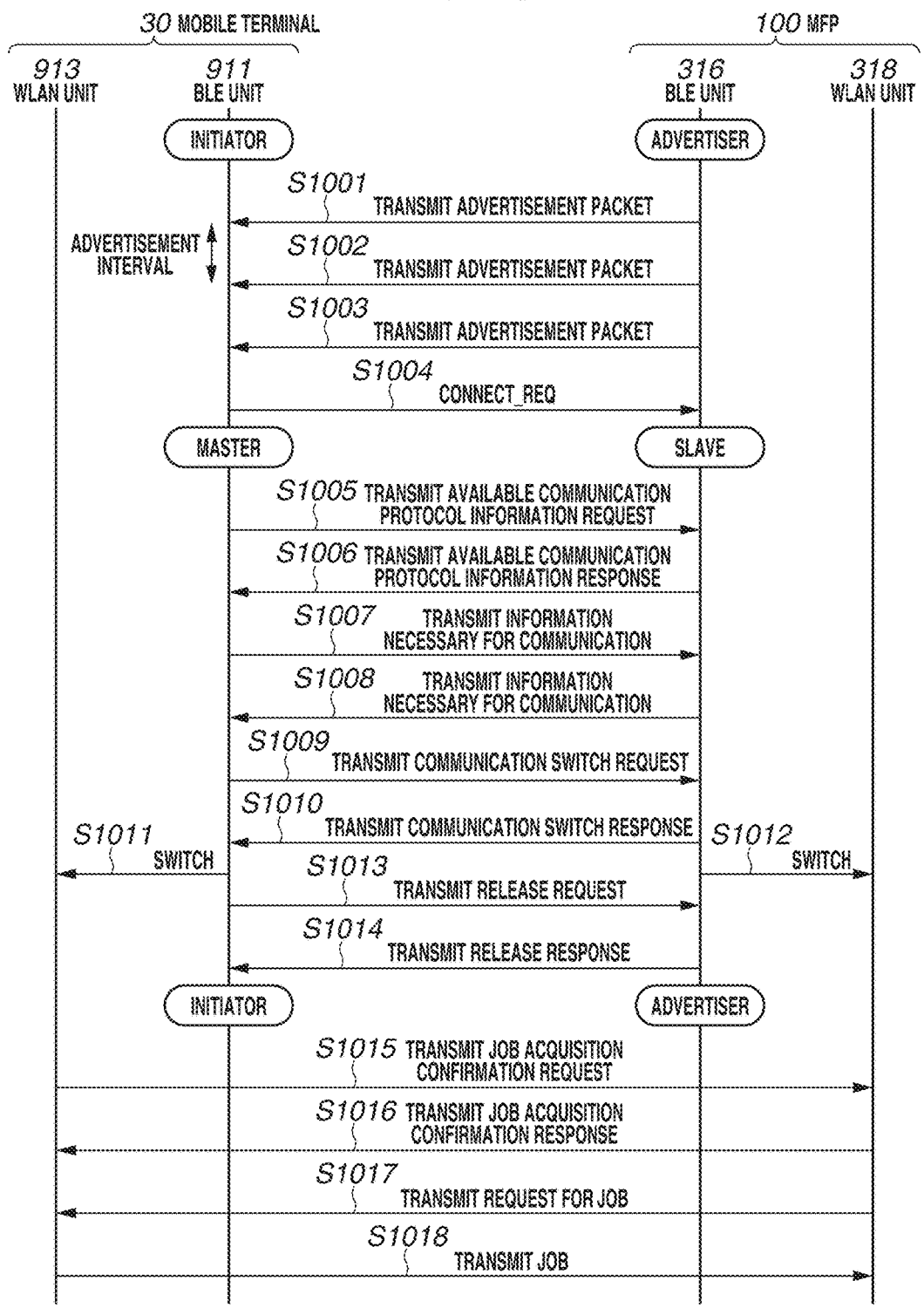
FIG. 10 illustrates a sequence of job transmission and reception processing via BLE communication according to one exemplary embodiment.

FIG. 10 illustrates a sequence of job transmission and reception by a handover between the mobile terminal 30 and the MFP 100. The handover is a technique in which apparatuses to communicate with each other use a near-field communication method to transmit and receive connection information for performing communication using a high-speed communication method and then switch to the high-speed communication method to transmit and receive data using the high-speed communication method. In the present exemplary embodiment, a BLE communication method is used as the near-field communication method, and a Wi-Fi communication method is used as the high-speed communication method. The communication speed of BLE communication is lower than the communication speed of Wi-Fi communication. Thus, authentication between the mobile terminal 30 and the MFP 100, transmission and reception of connection information for Wi-Fi communication, and the like are performed in the BLE communication, and the transfer of large-capacity data (job in the present exemplary embodiment) is performed in the Wi-Fi communication in which the communication speed is high, whereby efficient data transfer is realized. The communication methods used in the handover are not limited to the above-described communication methods, and various communication methods may be used as the near-field communication method and the high-speed communication method. For example, connection information for Wi-Fi communication may be transmitted and received via NFC communication or Wi-Fi Aware communication, and then data may be transmitted and received via Wi-Fi communication.

The CPU 302 loads the control program stored in the ROM 303 or HDD (not illustrated) included in the MFP 100 into the RAM 304 and executes the control program to realize the processing of the MFP 100 specified in the sequence. Further, the CPU 902 loads the control program stored in the ROM 903 or HDD (not illustrated) included in the mobile terminal 30 into the RAM 904 and executes the control program to realize the processing of the mobile terminal 30 specified in the sequence.

In the following description, the MFP 100 is an advertiser which transmits an advertisement packet at predetermined intervals. Further, the mobile terminal 30 is an initiator which waits for an advertisement packet transmitted from a nearby advertiser. First, in steps S1001 to S1003, the BLE unit 316 transmits an advertisement packet. The mobile terminal 30 can recognize the presence of the MFP 100 when the BLE unit 911 receives the advertisement packet transmitted from the BLE unit 316.

If the mobile terminal 30 recognizes the MFP 100 and determines to connect to the MFP 100, the mobile terminal 30 transmits connection request information to the MFP 100. More specifically, in step S1004, the BLE unit 911 transmits a CONNECT_REQ, which is a request for changing to a connection event to establish a BLE network connection. If the BLE unit 316 receives the CONNECT_REQ, the mobile terminal 30 and the MFP 100 prepare to change to the connection event. More specifically, the BLE unit 911 and the BLE unit 316 respectively notify the main board 901 and the main board 301 that the connection processing for BLE communication is completed. Thereafter, the mobile terminal 30 and the MFP 100 respectively change from the initiator and the advertiser to a master and a slave, and the mobile terminal 30 as the master and the MFP 100 as the slave establish a connection (BLE connection) for BLE communication. According to the BLE standards, a master can form a "point-to-multipoint" star topology with a slave. After the BLE connection is established, the mobile terminal 30 and the MFP 100 can perform data communication using the BLE communication method.

Then, in step S1005, the BLE unit 911 transmits to the BLE unit 316 a request for information about a communication protocol available for use by the MFP 100.

The request contains information about a communication protocol available for use by the mobile terminal 30, and the BLE unit 316 receives the request to thereby recognize that the mobile terminal 30 can use a communication method such as Wi-Fi. In step S1006, the BLE unit 316 transmits information about the communication protocol available for use by the BLE unit 316 in response to the request received in step S1005. In this way, the mobile terminal 30 and the MFP 100 can acquire information about the communication protocols available for use by the mobile terminal 30 and the MFP 100 other than BLE.

After the information about the communication protocols available for use by the mobile terminal 30 and the MFP 100 other than BLE is acquired, the mobile terminal 30 may determine to switch the communication between the mobile terminal 30 and the MFP 100 to Wi-Fi communication. At this time, whether to switch the communication method may be determined by the MFP 100. If it is determined to switch the communication method, then in steps S1007 and S1008, the mobile terminal 30 and the MFP 100 transmit and receive necessary communication information for Wi-Fi communication such as address information for the identification of a communication partner and SSID information.

Then, in step S1009, the BLE unit 911 transmits a request (communication switch request) for switching the method of communication between the mobile terminal 30 and the MFP 100 from BLE communication to Wi-Fi communication. If the BLE unit 316 receives the communication switch request, then in step S1010, the BLE unit 316 transmits a communication switch response.

If the communication switch request and the communication switch response are properly transmitted and received, then in step S1011, the mobile terminal 30 switches the communication unit used to communicate with the MFP 100 from the BLE unit 911 to the WLAN unit 913. Then, in step S1012, the MFP 100 switches the communication unit used to communicate with the mobile terminal 30 from the BLE unit 316 to the WLAN unit 318. After the switch, in step S1013, the BLE unit 911 transmits a release request. In step S1014, the BLE unit 316 having received the release request transmits a release response, and the BLE connection between the mobile terminal 30 and the MFP 100 is ended. After the BLE connection between the mobile terminal 30 and the MFP 100 is ended, the mobile terminal and the MFP 100 are respectively changed to the initiator and the advertiser again, and the BLE unit 316 restarts transmitting an advertisement packet.

Thereafter, the mobile terminal 30 and the MFP 100 perform Wi-Fi communication using the necessary information for Wi-Fi communication that is transmitted and received in steps S1007 and S1008. First, in step S1015, the WLAN unit 913 confirms with the WLAN unit 318 as to whether the MFP 100 is allowed to acquire a job. In the present exemplary embodiment, for example, information about a free space for temporarily storing an image to be transferred to the MFP 100 is confirmed. In step S1016, the WLAN unit 318 having received the confirmation request transmits a confirmation response to the confirmation request.

If an appropriate response is acquired and it is determined that the MFP 100 is allowed to acquire a job, then in step S1017, the WLAN unit 318 transmits a request for a job. Then, in step S1018, the WLAN unit 913 having received the job request transmits to the WLAN unit 318 a job including image data present in the mobile terminal 30. The job to be transmitted at this time is selected at a timing, for example, before the BLE connection is established, after the BLE connection is established, or after the Wi-Fi connection is established. Further, the job to be transmitted is not limited to the print job and may be, for example, a scan job for instructing the MFP 100 to perform scanning or a job for the acquisition of information about the state of the MFP 100 by the mobile terminal 30. Further, the job to be transmitted may be, for example, a command for executing various operations on the MFP 100 such as an operation to change the setting of the MFP 100. If the job transmission is completed, the mobile terminal 30 disconnects the Wi-Fi connection with the MFP 100 and returns to the previous network state immediately before the handover. More specifically, in a case where, for example, the mobile terminal 30 is connected to a mobile communication network such as the third generation (3G) or Long-Term Evolution (LTE) or an access point such as a router before the execution of the handover, the mobile terminal 30 reestablishes a connection to the mobile communication network or the access point. Thus, prior to the execution of the handover, the mobile terminal 30 stores information about the network state immediate before the handover, necessary communication information for the establishment of the network state, and the like.

As described above, the handover technique is used so that connection information for performing communication using a high-speed communication method is transmitted and received using a high-usability communication method (near-field communication method) and then large-capacity data is transmitted and received at high speed using the high-speed communication method.

In general, if the communication method is switched from BLE communication to Wi-Fi communication by the handover, the BLE unit 316 restarts transmitting an advertisement packet, so the MFP 100 is changed to the state in which the MFP 100 can execute a handover with an external device other than the mobile terminal 30.

At this time, there may be a case where job transmission by Wi-Fi communication is not completed because, for example, the mobile terminal 30 is preparing for data communication such as the selection or generation of a job to be transmitted or a job of a large data amount is being transmitted. In such a case, if an external device other than the mobile terminal 30 executes Wi-Fi communication with the MFP 100 by a handover, the reception of a job transmitted by the other external device may be completed first although the mobile terminal 30 executes the handover first. Since the MFP 100 starts the processing of a job in the order of completion of reception, there is a possibility that a subsequent job is processed before a previous job in such a case described above. Thus, in the present exemplary embodiment, when the MFP 100 is Wi-Fi connected to an external device such as the mobile terminal 30 by a handover, the MFP 100 executes control to prevent a situation in which a subsequent job is processed before a previous job. More specifically, the MFP 100 executes control to change the advertisement mode to stop advertisement in BLE as the control to prevent a situation in which a subsequent job is processed before a previous job. In other words, when the MFP 100 is Wi-Fi connected to an external device, the MFP 100 is changed to the state in which the MFP 100 cannot execute a handover with an external device other than the Wi-Fi connected external device.

The following describes the advertisement mode according to the present exemplary embodiment. The advertisement mode refers to a mode for defining an advertisement method and contents of an advertisement packet to be transmitted. In the present exemplary embodiment, there are two advertisement modes in which the MFP 100 is operable, which are a normal mode and a non-connectable mode.

The normal mode is a mode that is set to the MFP 100 in the normal state in which no Wi-Fi connection with an external device is established by a handover. When the MFP 100 operates in the normal mode, the MFP 100 executes both the transmission processing and the reception processing as illustrated in FIG. 8A. Further, the advertisement packet to be transmitted in this case stores in the connection information 504 search information indicating that a search is allowed. In this way, the MFP 100 can broadcast the advertisement packet to enable an external device to recognize the presence of the MFP 100. Further, the MFP 100 can receive connection request information from the external device, connect to the external device, and perform BLE communication. The normal mode includes two modes. In one mode, a destination is designated and the advertisement packet is transmitted to the designated destination. In another mode, the advertisement packet is transmitted without designating a destination. In the present exemplary embodiment, either one of the two modes may be used in the normal mode. The advertisement packet is classified according to three different properties (connectability, scannability, directability). More specifically, the advertisement packet is classified into four types, ADV_IND, ADV_DIRECT_IND, ADV_NONCONN_IND, and ADV_SCAN_IND. Among the four types, ADV_IND and ADV_DIRECT_IND have a "connectable" attribute in the connectability. In the present exemplary embodiment, the MFP 100 is connectable to an external device in the normal mode, so the advertisement packet of the type ADV_IND or ADV_DIRECT_IND is transmitted.

The non-connectable mode is a mode that is set to the MFP 100 in a case where the MFP 100 is Wi-Fi connected to an external device by a handover. In the present exemplary embodiment, when the MFP 100 operates in the non-connectable mode, the MFP 100 executes neither the transmission processing nor the reception processing as illustrated in FIG. 8C. In other words, when the MFP 100 is changed to the non-connectable mode, the MFP 100 stops advertisement. When the MFP 100 stops advertisement, the MFP 100 no longer receives connection request information and therefore no longer establishes a BLE connection with an external device. Thus, when the MFP 100 is in the non-connectable mode, the MFP 100 does not execute Wi-Fi communication by a handover via BLE communication with a device other than the external device with which the MFP 100 executes Wi-Fi communication since before the change to the non-connectable mode.

The condition for the execution of the control to prevent a situation in which a subsequent job is processed before a previous job is not limited to the above-described condition. The control may be executed in a case where, for example, the reception of data from the Wi-Fi connected external device is not completed or the processing of a job received from the Wi-Fi connected external device is not completed. The control to prevent a situation in which a subsequent job is processed before a previous job is not limited to the control described above. For example, control may be performed in such a manner that no Wi-Fi connection with an external device other than the external device with which a Wi-Fi connection is already established is executed in order to prevent a situation in which a subsequent job is processed before a previous job as a result of executing a Wi-Fi connection without going through BLE.

Figure 11:
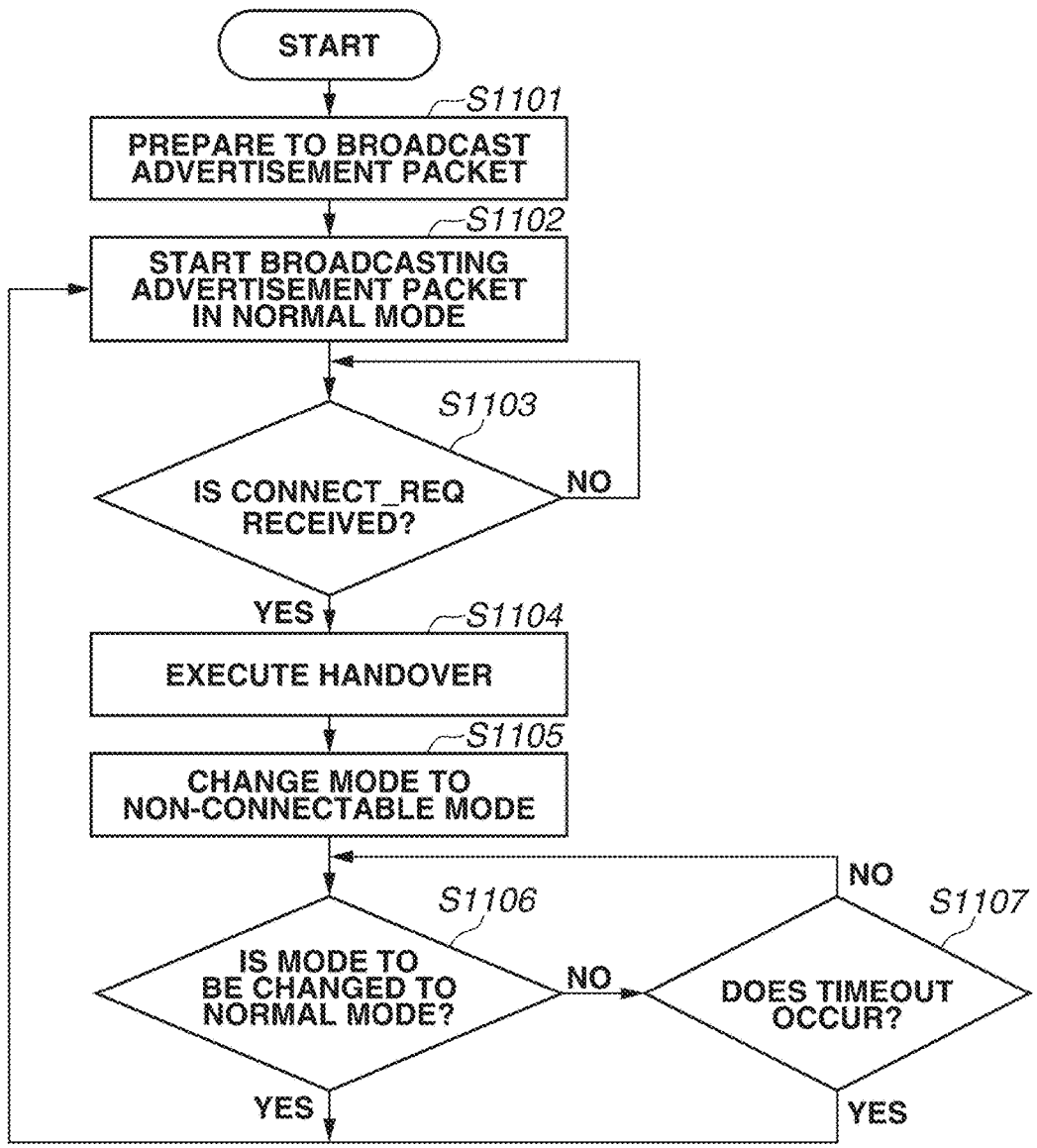
FIG. 11 is a flow chart illustrating a process which is executed by a communication apparatus to which an exemplary embodiment is applied.

FIG. 11 is a flow chart illustrating an advertisement mode changing process which is executed by the MFP 100 according to the present exemplary embodiment. The CPU 302 loads the control program stored in the ROM 303 or HDD (not illustrated) included in the MFP 100 into the RAM 304 and executes the control program to realize the processing illustrated in the flow chart. The processing illustrated in the flow chart is started when advertisement is started, e.g., when the power supply of the main body of the MFP 100 is turned on or when the power supply of the BLE unit 316 is turned on.

First, in step S1101, the CPU 302 prepares to broadcast the advertisement packet. More specifically, for example, the CPU 302 acquires from the memory such as the RAM 304 necessary data for generating the advertisement packet illustrated in FIG. 5.

Next, in step S1102, the CPU 302 causes the BLE unit 316 to start broadcasting the advertisement packet. At this time, the MFP 100 is in the normal mode, so the transmission processing and the reception processing are both executed as illustrated in FIG. 8A.

Next, in step S1103, the CPU 302 determines whether the BLE unit 316 receives a CONNECT_REQ. If the CPU 302 determines that the BLE unit 316 receives a CONNECT_REQ (YES in step S1103), then in step S1104, the CPU 302 executes a handover with an external device having issued the CONNECT_REQ. More specifically, the CPU 302 establishes a BLE connection between the MFP 100 and the external device to transmit and receive communication information and thereafter establishes a Wi-Fi connection between the MFP 100 and the external device. A method of the handover is as illustrated in FIG. 10. As described above, when a BLE connection is established between the MFP 100 and the external device, the BLE unit 316 stops advertisement, but when the BLE connection between the MFP 100 and the external device is disconnected, the BLE unit 316 attempts to restart advertisement. On the other hand, if the CPU 302 determines that the BLE unit 316 receives no CONNECT_REQ (NO in step S1103), the CPU 302 repeats the determination until the BLE unit 316 receives a CONNECT_REQ.

When the Wi-Fi connection is established between the MFP 100 and the external device in step S1104, the mode change condition is satisfied. Thus, in step S1105, the CPU 302 performs control in such a manner that the MFP 100 is changed to the non-connectable mode and the BLE unit 316 stops advertisement. More specifically, the CPU 302 performs control in such a manner that the BLE unit 316 executes neither the transmission processing nor the reception processing to prevent a BLE connection with an external device. In this way, the MFP 100 can perform control in such a manner that no handover via BLE communication is executed, thereby preventing a situation in which a subsequent job is processed before a previous job.

Next, in step S1106, the CPU 302 determines whether the mode change conditions are no longer satisfied, and also determines whether to change the MFP 100 to the normal mode. More specifically the CPU 302 determines whether the Wi-Fi connection with the external device is disconnected. Alternatively, the CPU 302 determines whether the reception of data from the external device is completed or whether the processing of a job received from the external device is completed. At this time, the CPU 302 may determine that the mode change conditions are no longer satisfied if all of the mode change conditions are no longer satisfied or if a combination of some of the mode change conditions is no longer satisfied. Further, the mode change conditions as to which the determination in step S1106 is to be performed may freely be set by a user. If the CPU 302 determines that the mode change conditions are no longer satisfied (YES in step S1106), the CPU 302 cancels the non-connectable mode and changes the MFP 100 to the normal mode. Then, in step S1102, the CPU 302 restarts advertisement in the normal mode. On the other hand, if the CPU 302 determines that the mode change conditions are satisfied (NO in step S1106), the processing proceeds to step S1107.

In step S1107, the CPU 302 performs timeout determination. More specifically, the CPU 302 determines whether the time that has passed since the MFP 100 is changed to the non-connectable mode in step S1105 exceeds a predefined threshold value. The predefined threshold value used in the timeout determination may be set by a user or may be a value that is preset at the time of shipment. If the CPU 302 determines that the time that has passed since the MFP 100 is changed to the non-connectable mode does not exceed the predefined threshold value (NO in step S1107), step S1106 is repeated. On the other hand, if the CPU 302 determines that the time that has passed since the MFP 100 is changed to the non-connectable mode exceeds the predefined threshold value (YES in step S1107), the CPU 302 cancels the non-connectable mode and changes the MFP 100 to the normal mode. Then, in step S1102, the CPU 302 restarts advertisement in the normal mode. The timeout determination enables the MFP 100 to recover to the normal mode without waiting for the completion of the reception or processing of the job even in a case where, for example, the transmission/reception or processing of the job is interrupted due to an occurrence of a communication error, a job error, or the like.

In this way, the MFP 100 can switch the advertisement mode of the BLE unit 316 according to the state of the connection or communication with the external device.

According to the BLE standards, when a BLE connection is established, the BLE unit 316 stops advertisement, and when the BLE connection is cancelled, the BLE unit 316 restarts advertisement. Thus, in general, the BLE unit 316 restarts advertisement when the connection between the MFP 100 and the external device is switched by a handover from the BLE connection to the Wi-Fi connection. However, in the present exemplary embodiment, even when the BLE connection is cancelled, if the Wi-Fi connection is established between the MFP 100 and the external device, the BLE unit 316 does not restart advertisement and prevents execution of a handover. This prevents a situation in which although an external device executes a handover previously, another external device executing a handover subsequently transmits a job to result in execution of processing of the job before a previous job.

In the first exemplary embodiment, the case is described in which the transmission processing and the reception processing are not executed in BLE advertisement in the non-connectable mode. In a second exemplary embodiment, a case will be described in which processing different from the processing in the first exemplary embodiment is executed in the non-connectable mode.

In the following description, the non-connectable mode in which the transmission processing and the reception processing are not executed will be referred to as a first non-connectable mode, and a non-connectable mode which is different from the first non-connectable mode will be referred to as a second non-connectable mode.

The configuration of the communication system in the present exemplary embodiment is similar to the configuration of the communication system in the first exemplary embodiment, so description thereof is omitted. Further, the mode change conditions in the present exemplary embodiment are similar to the mode change conditions in the first exemplary embodiment, so description thereof is omitted.

In the present exemplary embodiment, when the mode change conditions are satisfied, the MFP 100 operates in the second non-connectable mode. The second non-connectable mode is a mode in which the BLE unit 316 does not execute the reception processing and transmits in the transmission processing the advertisement packet which stores information for notification of the state of the MFP 100 in which the MFP 100 does not receive a job. More specifically, when the MFP 100 is in the second non-connectable mode, the MFP 100 executes advertisement as illustrated in FIG. 8B.

In the present exemplary embodiment, the "state in which execution of a handover is controlled" refers to the state in which the mode change conditions are satisfied. Examples include the "state in which the MFP 100 is Wi-Fi connected to an external device" and the "state in which the reception of data from an external device to which the MFP 100 is Wi-Fi connected is not completed". Thus, when the MFP 100 is in the second non-connectable mode, the MFP 100 stores information for notification that the MFP 100 is in the state. In the present exemplary embodiment, the advertisement mode information 506 or the like is used as the information for notification that the MFP 100 is in the state. The payload 502 may include a new region for notification that the MFP 100 is in the state.

Figure 13B:
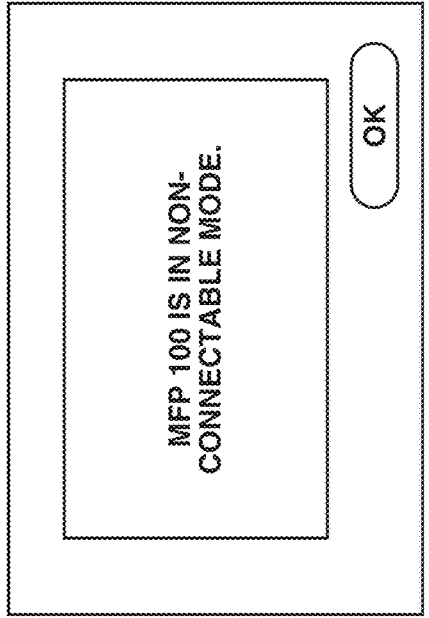
FIGS. 13A, 13B, 13C, and 13D each illustrate a screen displayed on an external device by a communication apparatus to which an exemplary embodiment is applied.
Figure 13D:
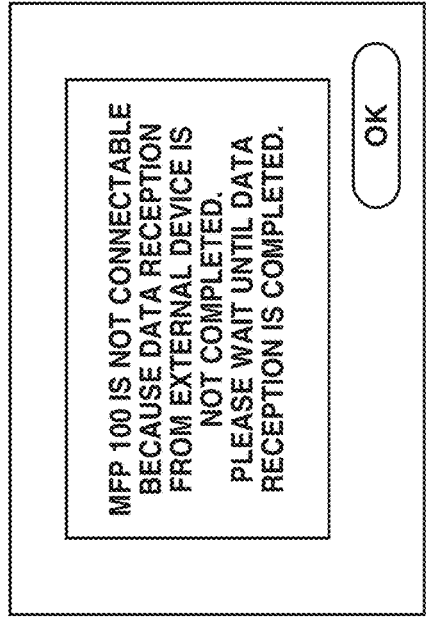
Figure 13A:
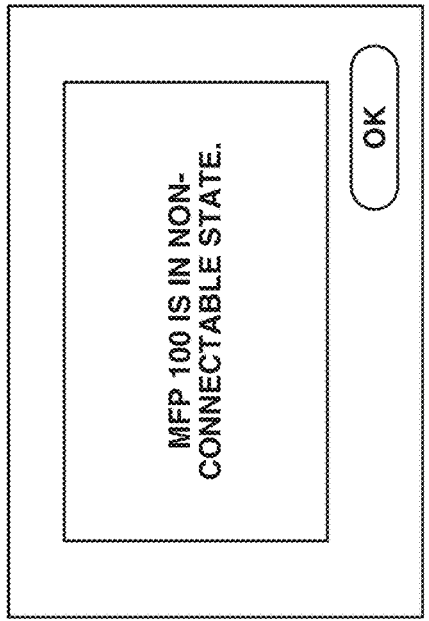
Figure 13C:
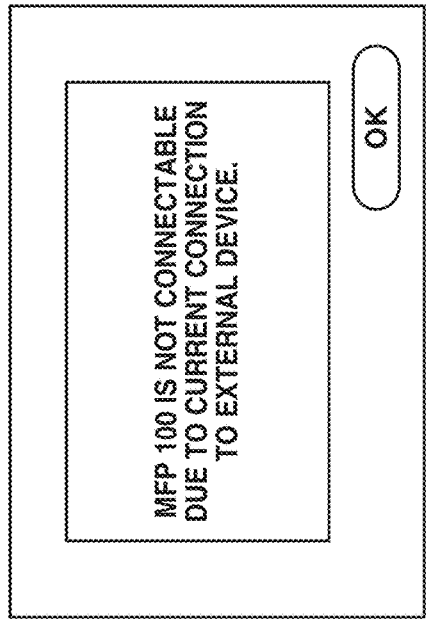

Then, the MFP 100 displays on the external device having received the advertisement packet storing the information, for example, a notification screen indicating the communication state of the MFP 100 as illustrated in FIG. 13A, thereby notifying the user of the state of the MFP 100 in which the MFP 100 does not receive a job. In order to notify the state to the user, the MFP 100 may display on the external device a screen for notification of the advertisement mode of the MFP 100 at the time of the advertisement as illustrated in FIG. 13B. Further, the MFP 100 may display on the external device a screen for notification of the cause of the change of the advertisement mode as illustrated in FIGS. 13C and 13D.

As described above, in the second non-connectable mode, the MFP 100 executes transmission of the advertisement packet but does not execute reception of connection request information so that no BLE connection with the external device is established. Thus, in the second non-connectable mode, the MFP 100 transmits the advertisement packet of the type of ADV_NONCONN_IND or ADV_SCAN_IND having a "non-connectable" attribute in the connectability. No connection information may be added to the advertisement packet transmitted in the second non-connectable mode, and information to instruct the external device not to return connection request information may be added.

Figure 12:
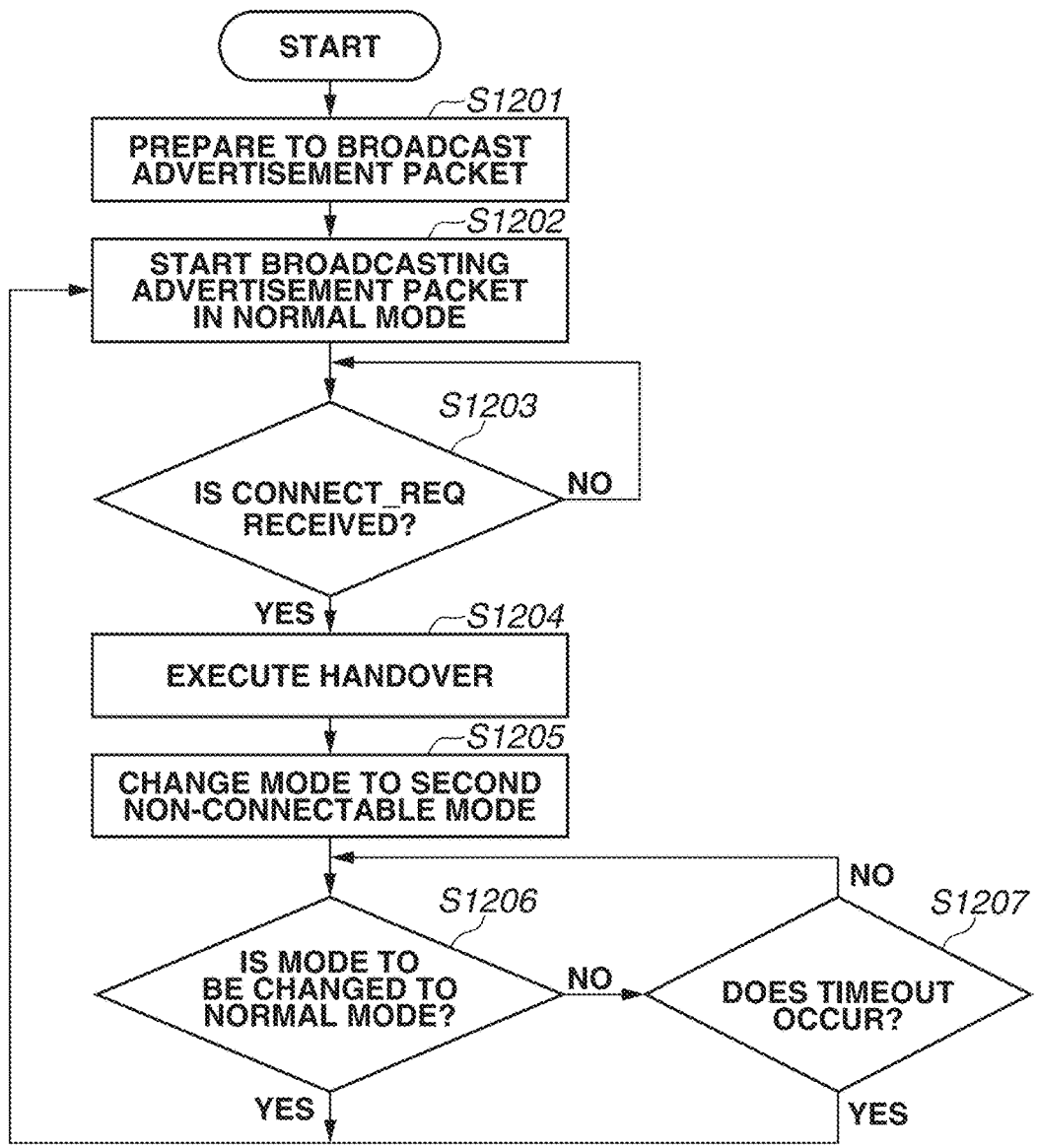
FIG. 12 is a flow chart illustrating a process which is executed by a communication apparatus to which an exemplary embodiment is applied.

The following describes the advertisement mode changing process which is executed by the MFP 100 in the present exemplary embodiment, with reference to FIG. 12. The CPU 302 loads the control program stored in the ROM 303 or HDD (not illustrated) included in the MFP 100 into the RAM 304 and executes the control program to realize the processing illustrated in the flow chart. The processing illustrated in the flow chart is started when advertisement is started, e.g., when the power supply of the main body of the MFP 100 is turned on or when the power supply of the BLE unit 316 is turned on.

Steps S1201 to S1204, S1206, and S1207 are similar to steps S1101 to S1104, S1106, and S1107, so description thereof is omitted.

In step S1205, the CPU 302 changes the MFP 100 to the second non-connectable mode. More specifically, the CPU 302 ends the reception processing performed by the BLE unit 316. Further, the CPU 302 performs control in such a manner that in the transmission processing performed by the BLE unit 316, the advertisement packet storing information for notification of the state of the MFP 100 in which the MFP 100 does not execute a handover.

In this way, the MFP 100 can notify the state of the MFP 100 to the user having the external device which receives the advertisement packet. Then, the MFP 100 can prompt the user to use a different communication apparatus or can explain why the external device and the MFP 100 cannot execute a handover. Further, the MFP 100 omits the reception processing so that no connection request information is received to prevent execution of a handover and to reduce power consumption.

The communication method for transmitting the information for notification of the state of the MFP 100 is not limited to BLE. A different communication method such as Wi-Fi may be used to transmit the information for notification of the state of the MFP 100.

Further, either one of the first and second non-connectable modes may be set as the mode in which the MFP 100 operates when the mode change conditions are satisfied.

Other Embodiments

As long as the advantages of the above-described exemplary embodiments are realized, the order of processing in the flow charts in the above-described exemplary embodiments may be changed, not all the processing must be executed, and details of the processing may be changed.

As described above, the near-field communication method used for a handover is not limited to BLE, and NFC, Wi-Fi Aware, and the like may be used. In the case where, for example, NFC is used as the near-field communication method, control is performed to prevent a situation in which a subsequent job is processed before a previous job, by deleting communication information stored in a memory of a NFC communication unit or turning off a power supply of the NFC communication unit. In this way, the communication information stored in the NFC communication unit is not read by an external device and is thus not acquired by the external device.

While the processing which is executed when the communication apparatus transmits the BLE advertisement packet to the external device is described in the above-described exemplary embodiments, information which is different from the BLE advertisement packet may be used to notify the external device of the presence of the communication apparatus. For example, the communication apparatus may notify the external device of the presence of the communication apparatus by notification of information based on a Wi-Fi function. Then, the information issued by the communication apparatus based on the Wi-Fi function may contain information which is similar to the information in the above-described exemplary embodiments.

While the case in which a connection according to the high-speed communication method is performed using a handover is described in the above-described exemplary embodiments, the communication apparatus may perform a connection according to the high-speed communication method without using a handover. In this case, for example, the communication apparatus enables an access point of the communication apparatus and broadcasts information about the enabled access point to the surrounding area. Then, after the broadcast access point information is acquired by an external device, input of a password and authentication processing for using the access point are performed to establish a connection using the high-speed communication method. In an exemplary embodiment, the control to prevent a situation in which a subsequent job is processed before a previous job may be executed even when a connection according to the high-speed communication method without using a handover is established instead of a connection according to the high-speed communication method using a handover.

The above-described exemplary embodiments can also be realized by supplying a program which realizes one or more functions of the above-described exemplary embodiments to a system or apparatus via a network or record medium and then causing one or more processors in a computer of the system or apparatus to execute the program. Further, the above-described exemplary embodiments can also be realized by a circuit (e.g., application specific integrated circuit (ASIC)) which realizes one or more functions.

Various exemplary embodiments prevent a decrease in the speed of communication with an external device due to execution of a handover in a case where a connection is established with the external device.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments have been described with reference to exemplary embodiments, the scope of the following claims is to be accorded the broadest interpretation so as to encompass all such modifications and equivalent structures and functions.

What is claimed is:

1. A communication apparatus capable of performing communication using a first communication method and communication using a second communication method different from the first communication method, comprising:
   at least one processor that controls units including:
   a starting unit configured to start operation as a slave apparatus for communication using the first communication method;
   a communication unit configured to communicate, using the first communication method, with an external apparatus, communication information for performing communication using the second communication method after starting the operation as the slave apparatus for communication using the first communication method;
   an establishment unit configured to perform establishment processing for establishing a connection of the communication apparatus using the second communication method after communicating the communication information with the external apparatus using the first communication method;
   a stopping unit configured to stop the operation as the slave apparatus for communication using the first communication method on a basis of establishment, based on the establishment processing, of the connection of the communication apparatus using the second communication method; and
   a restarting unit configured to restart the operation as the slave apparatus for communication using the first communication method on a basis of disconnection of the connection of the communication apparatus established using the second communication method on a basis of the establishment processing.

2. The communication apparatus according to claim 1, wherein the operation as the slave apparatus for communication using the first communication method includes operation of broadcasting connection information to, using the first communication method, the external apparatus located near the communication apparatus, and wherein, in a case where the connection information that is broadcast is received by the external apparatus, the communication apparatus establishes a connection to the external apparatus using the first communication method to become able to communicate the communication information.

3. The communication apparatus according to claim 1, wherein the at least one processor further controls a processing unit configured to process a job received from the external apparatus using the second communication method, and wherein the operation as the slave apparatus for communication using the first communication method is restarted on a basis of completion of processing of the job received from the external apparatus using the second communication method and the disconnection of the connection of the communication apparatus established using the second communication method on a basis of the establishment processing.

4. The communication apparatus according to claim 1, wherein the operation as the slave apparatus for communication using the first communication method is stopped after establishing the connection using the second communication method on a basis of the establishment processing.

5. The communication apparatus according to claim 1, wherein the operation as the slave apparatus for communication using the first communication method is restarted after disconnecting the connection established using the second communication method on a basis of the establishment processing.

6. The communication apparatus according to claim 5, wherein the operation as the slave apparatus for communication using the first communication method is restarted without any user operation to the communication apparatus after disconnecting the connection established by the communication apparatus using the second communication method.

7. The communication apparatus according to claim 1, wherein the first communication method is Bluetooth®.

8. The communication apparatus according to claim 1, wherein the second communication method is Wi-Fi®.

9. The communication apparatus according to claim 1, wherein the at least one processor further controls a processing unit configured to process a job received from the external apparatus using the second communication method, wherein the job processed by the processing unit is a print job for causing the communication apparatus to perform printing or a scan job for causing the communication apparatus to perform scanning, and wherein the processing unit performs print processing or scan processing depending on the job received using the second communication method.

10. The communication apparatus according to claim 1, wherein the connection, based on the establishment processing, of the communication apparatus using the second communication method is a connection between the communication apparatus and the external apparatus.

11. The communication apparatus according to claim 1, wherein the communication information is service set identifier (SSID).

12. The communication apparatus according to claim 1, wherein the communication apparatus is a music reproduction device.

13. A control method of controlling a communication apparatus capable of performing communication using a first communication method and communication using a second communication method different from the first communication method, comprising:

starting operation as a slave apparatus for communication using the first communication method;

communicating, using the first communication method, with an external apparatus, communication information for performing communication using the second communication method after starting the operation as the slave apparatus for communication using the first communication method;

performing establishment processing for establishing a connection of the communication apparatus using the second communication method after communicating the communication information with the external apparatus using the first communication method;

stopping the operation as the slave apparatus for communication using the first communication method on a basis of establishment, based on the establishment processing, of the connection of the communication apparatus using the second communication method; and restarting the operation as the slave apparatus for communication using the first communication method on a basis of disconnection of the connection of the communication apparatus established using the second communication method on a basis of the establishment processing.

14. The control method according to claim 13, wherein the operation as the slave apparatus for communication using the first communication method includes operation of broadcasting connection information to, using the first communication method, the external apparatus located near the communication apparatus, and wherein, in a case where the connection information that is broadcast is received by the external apparatus, the communication apparatus establishes a connection to the external apparatus using the first communication method to become able to communicate the communication information.

15. The control method according to claim 13, further comprising:

processing a job received from the external apparatus using the second communication method, wherein the operation as the slave apparatus for communication using the first communication method is restarted on a basis of completion of processing of the job received from the external apparatus using the second communication method and the disconnection of the connection of the communication apparatus established using the second communication method on a basis of the establishment processing.

16. The control method according to claim 13, wherein the operation as the slave apparatus for communication using the first communication method is stopped after establishing the connection using the second communication method on a basis of the establishment processing.

17. The control method according to claim 13, wherein the operation as the slave apparatus for communication using the first communication method is restarted after disconnecting the connection established using the second communication method on a basis of the establishment processing.

18. The control method according to claim 17, wherein the operation as the slave apparatus for communication using the first communication method is restarted without any user operation to the communication apparatus after disconnecting the connection established by the communication apparatus using the second communication method.

19. The control method according to claim 13, wherein the first communication method is Bluetooth®.

20. The control method according to claim 13, wherein the second communication method is Wi-Fi®.

21. The control method according to claim 13, further comprising:

processing a job received from the external apparatus using the second communication method,
wherein the job that is processed is a print job for causing the communication apparatus to perform printing or a scan job for causing the communication apparatus to perform scanning, and
wherein print processing or scan processing is performed depending on the job received using the second communication method.

22. The control method according to claim 13, wherein the connection, based on the establishment processing, of the communication apparatus using the second communication method is a connection between the communication apparatus and the external apparatus.

23. The control method according to claim 13, wherein the communication information is service set identifier (SSID).

24. The control method according to claim 13, wherein the communication apparatus is a music reproduction device.

* * * * *